(No Model.)

H. LINDENBERG.
LIQUID COOLER.

No. 294,889. Patented Mar. 11, 1884.

WITNESSES:
Theo. G. Hoster
C. Sedgwick

INVENTOR:
H. Lindenberg
BY Munn & Co.
ATTORNEYS.

UNITED STATES PATENT OFFICE.

HERMAN LINDENBERG, OF JERSEY CITY, NEW JERSEY.

LIQUID-COOLER.

SPECIFICATION forming part of Letters Patent No. 294,889, dated March 11, 1884.

Application filed July 25, 1883. (No model.)

*To all whom it may concern:*

Be it known that I, HERMAN LINDENBERG, of Jersey City, in the county of Hudson and State of New Jersey, have invented a new and Improved Liquid-Cooler, of which the following is a full, clear, and exact description.

The object of my invention is to provide a new and improved device for cooling liquids very rapidly while being drawn from a barrel, &c.

The invention consists in a flat sheet-metal vessel adapted to be connected with the spigot of a barrel and provided at its lower part with a cock or spigot. The vessel is provided with a series of transverse partitions, which cause the liquid to circulate in the vessel, whereby it will be cooled by coming in contact with the side of the vessel, which is placed in a box filled with ice.

Reference is to be had to the accompanying drawings, forming part of this specification, in which similar letters of reference indicate corresponding parts in all the figures.

Figure 1:
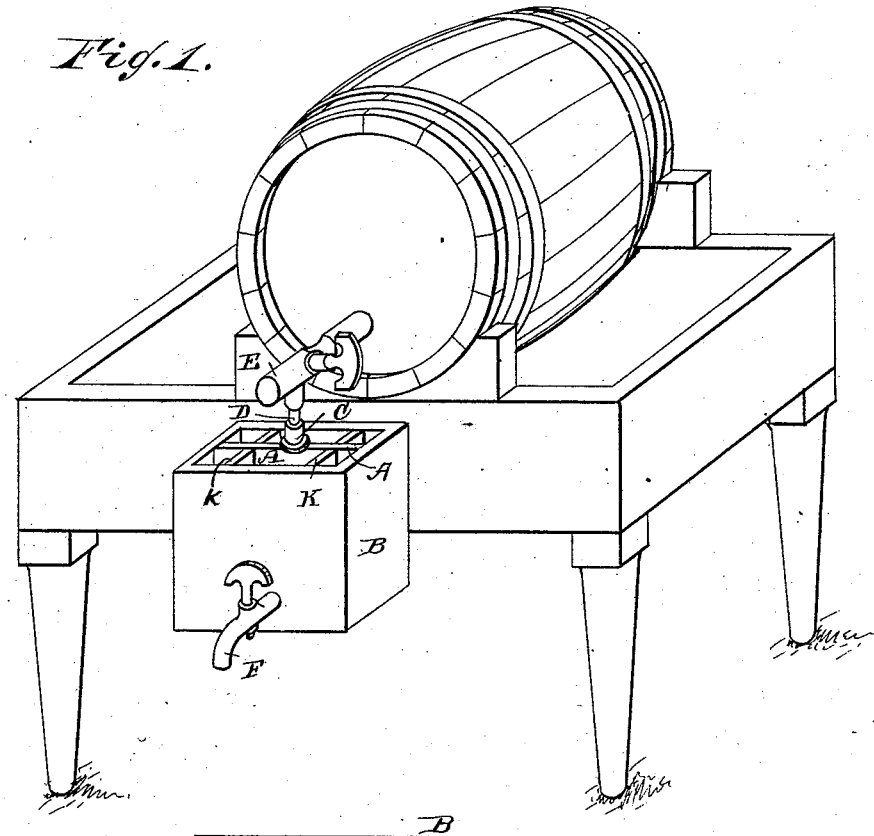
Figure 2:
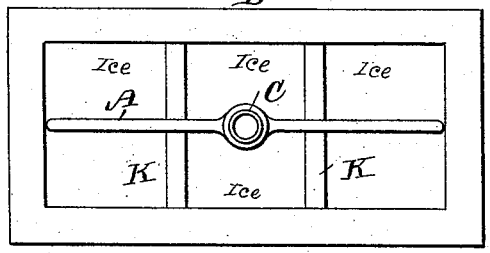
Figure 3:
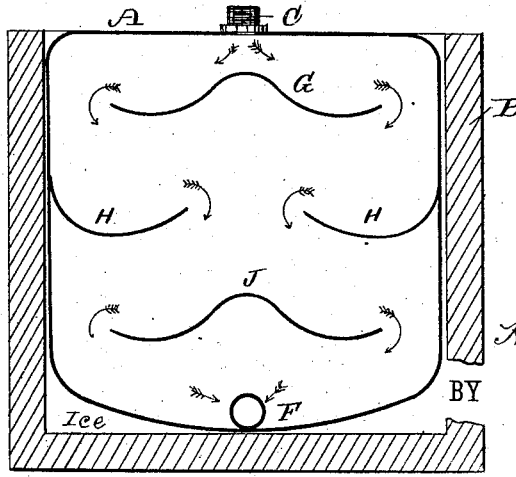

Figure 1 is a perspective view of my improved liquid-cooler, showing the manner in which it is used. Fig. 2 is a plan view of the same. Fig. 3 is a longitudinal sectional elevation of the same.

A very flat vessel, A, made of very thin sheet metal, is placed centrally and in an upright position into a box, B, for receiving ice. The flat vessel A is hermetically closed on all sides, and is provided on its top with a screw-threaded neck, C, on which a coupling-pipe, D, can be screwed to connect the spigot of a barrel with the vessel A. At its lowest point the vessel A is provided with a cock or spigot, F, which projects from the front of the box B. The upper corners of the vessel A are rounded, and the bottom is inclined from the side edges toward the middle, where the cock or spigot F is fastened. A curved horizontal partition, G, is arranged in the vessel A, the said partition extending to within short distances of the side edges. Below the partition G two horizontal partitions, H, project from the side edges toward the middle of the vessel, and below the partitions H another central horizontal partition, J, is provided. The partitions G H J cause the liquid admitted into the vessel A to circulate in the same, as indicated by the arrows, whereby the liquid will be cooled very rapidly by coming in contact with the cold sides of the vessel A.

The box B is fastened to the support for the barrel, and the vessel A is connected with the spigot, which remains turned on, the cock F being closed, so that a quantity of the liquid will be held in the vessel A at all times, so that the first liquid drawn will be very cold. As the liquid in the vessel A has the same pressure as the liquid in the barrel, I have provided transverse partitions K, to prevent the sides of the vessel A from being bulged outward. The corners of the vessel A are rounded, so that no liquid can collect in the corners, and the vessel can be thoroughly cleaned by rinsing it. By making the vessel very flat a large cooling-surface is obtained, and the quantity of liquid in the vessel A at a time is very small, and is thus cooled rapidly.

Having thus fully described my invention, I claim as new and desire to secure by Letters Patent—

1. A liquid-cooler made substantially as herein shown and described, and consisting of a flat sheet-metal vessel contained in a box filled with ice, the liquid to be cooled being conducted through the said vessel, as set forth.

2. In a liquid-cooler, the combination, with the flat sheet-metal vessel A, of the screw-neck C, the spigot F, and the partitions G H J, substantially as herein shown and described, and for the purpose set forth.

3. In a liquid-cooler, the combination, with the vessel A, having rounded corners, of partitions G H J, the screw-neck C, and the spigot F, substantially as herein shown and described.

4. In a liquid-cooler, the combination, with the flat sheet-metal vessel A, of partitions G H J, the screw-neck C, the spigot F, and the ice-box B, substantially as herein shown and described.

5. In a liquid-cooler, the combination, with the flat sheet-metal vessel A, of the screw-neck C, the spigot F, and the ice-box B, having partitions K, substantially as herein shown and described.

HERMAN LINDENBERG.

Witnesses:
JOHN KINDGEN,
JEAN BAPT. FISCHER.